United States Patent [19]

Stouffer et al.

[11] Patent Number: 5,297,989
[45] Date of Patent: Mar. 29, 1994

[54] NOZZLE FOR DISCHARGING AIR AND METHOD

[75] Inventors: Ronald D. Stouffer, Silver Spring; Ernest W. Chesnutis, Jr.; Milan Kuklik, both of Columbia, all of Md.

[73] Assignee: Bowles Fluidics Corporation, Columbia, Md.

[21] Appl. No.: 3,702

[22] Filed: Jan. 13, 1993

[51] Int. Cl.⁵ .............................................. B60H 1/34
[52] U.S. Cl. ........................................ 454/155; 454/309
[58] Field of Search ............... 454/109, 152, 155, 284, 454/289, 293, 294, 296, 297, 309

[56] References Cited

U.S. PATENT DOCUMENTS

| | | |
|---|---|---|
| 3,200,734 | 8/1965 | Burns et al. |
| 3,356,006 | 12/1967 | Scott |
| 3,548,735 | 12/1970 | Sweeney |
| 4,664,022 | 5/1987 | Oddenino |
| 4,669,370 | 6/1987 | Hildebrand et al. |
| 4,702,155 | 10/1987 | Hildebrand et al. |

FOREIGN PATENT DOCUMENTS 38347 2/1986 Japan .................................. 454/155

OTHER PUBLICATIONS

"Improved Ventilating Register", *Iron Age*, Aug. 23, 1988 p. 296.

*Primary Examiner*—Harold Joyce
*Attorney, Agent, or Firm*—Jim Zegeer

[57] ABSTRACT

An air discharge nozzle and method for vehicles having a grill which has a high degree of visual opacity to enhance design aesthetics, low impedance to air flow so that the face velocity remains high, and which does not significantly affect directionality of the air as imparted to the air stream by an upstream control mechanism. The grill is comprised of a monolayer of polygonal cells in an array of cells, each cell being bounded by planar walls having a depth "L" interstitial thickness "T" and a diameter or major dimension "D", wherein the interstitial depth L is short enough such that the planar walls do not act as vanes to significantly affect directionality of the air, the interstitial thickness T has a value such that the impedance to air flow is low, and the length to diameter ratio L/D is no greater than about 0.7 and no less than about 0.3, such that the relative visual opacity of the grill when viewed from any angle is high. The open cell area Ao must be at least about 76% of the available (total) area to obtain an acceptable 1800 ft/min face velocity at a blower pressure of 0.24 inches $H_2O$.

The upstream directionality control mechanism includes an open intruder frame having converging walls. The intruder frame has an axially projecting control shaft which carries a spherical member frictionally received in a spherical socket formed in the grill such that the control shaft can easily be manually manipulated.

19 Claims, 4 Drawing Sheets

NOZZLE FOR DISCHARGING AIR AND METHOD

BACKGROUND AND BRIEF DESCRIPTION OF THE INVENTION

This invention relates to a nozzle for discharging air from an air supply into an enclosed space, such as a room, or to a vehicle interior, having a control device for controlling deflection of air from the nozzle through a grill having a high degree of visual opacity to obscure elements behind the grill while maintaining a high face velocity and without significantly affecting or impairing deflection of the air stream as imparted thereto by the upstream intruder control member.

Current nozzle grills, as found in vehicles, for example, are very transparent visually in that large areas behind the grill can be seen at even large off-axis angles, up to 70 degrees. Many grills are thin perforated metal or plastic sheets which, while having relatively high visual opacity, cause a drop or loss in air stream face velocity. When the thickness (T) of the physical interstitial structure forming the grill is reduced, with a concurrent increase in the face velocity (e.g. reduction in losses), the visual opacity decreases and large areas behind the grill can be seen. When the physical thickness T of the interstitial material is made thin with vane-like depth L, the grill material interferes with the directionality imparted to the air stream by the upstream control device.

In Stouffer et al. U.S. Pat. No. 4,686,890 an air nozzle having an open frame plate intruder member is disclosed for controlling the directionality of air discharged from the nozzle. In Jackson U.S. Pat. No. 4,413,551, front plates and directionality control is achieved by relative lateral movements between the front and back plates and the only part of the grill which is visible is the front plate. A somewhat similar directionality control scheme is illustrated in Elfverson U.S. Pat. No. 4,928,582. In Gona et al. U.S. Pat. No. 3,672,293 commonly adjusted parallel vanes are used for directionality control.

An object of the present invention is to provide an improved air discharge nozzle, and, especially a discharge nozzle, particularly useful for vehicle interiors. A specific object of the invention is to provide an air discharge nozzle and method for vehicles having a grill which has a high degree of visual opacity to enhance design aesthetics, low impedance so that the face velocity remains high, and which does not significantly affect directionality of the air as imparted to the air stream by an upstream control mechanism and which, preferably, can be molded. Another specific object of the invention is to provide an improved directionality control mechanism.

According to the invention, the grill is comprised of a monolayer of polygonal cells in an array of cells, each cell being bounded by planar walls having a depth "L" interstitial thickness "T" and a diameter or major dimension "D", wherein the interstitial depth L is short enough such that the planar walls do not act as vanes to significantly affect directionality of the air as imparted by the upstream directionality control mechanism, the interstitial thickness T has a value such that the impedance to air flow is low and the ratio of T/D is such that there is low friction losses at the grill and the length to diameter ratio L/D is no greater than about 0.7 and no less than about 0.3, such that the relative visual opacity of the grill when viewed from any angle is high. In order to accommodate modern molding practices, in the preferred embodiment, the depth L is no greater than about 5 times the interstitial thickness T. In the preferred embodiment, the open cell area Ao must be at least about 76% of the available (total) area to obtain an acceptable 1800 ft/min face velocity at a blower pressure of 0.24 inches $H_2O$. As defined herein, visual opacity ranges from 0 percent for an open nozzle (e.g. no grill) to where the grill is in place 24 percent is obscured when the observer is looking directly on the cells and the observer's viewing angle changes from an axial alignment with the cells and becomes more and more visually opaque to where, in the case of the L/D ratio of 0.67 or a 56 degree viewing angle equals 100 percent opacity.

The upstream directionality control mechanism includes an open intruder frame having an upstream bounding edge joined to its downstream boundary edge by converging walls so that the cross-sectional area of the total shadow area of the frame projected on a plane normal to the axial center is essentially constant so that the impedance to air flow is essentially constant. A cross member joined to the frame member has an axially projecting control shaft which carries a spherical member frictionally received in a spherical socket formed in the grill such that the control shaft can easily be manually manipulated. When the end of the shaft projects beyond the grill in the form of a control knob, the knob points in the direction the air is caused to flow. Moreover, since the intruder is an open frame, the amount of angular movement of the control shaft is significantly reduced.

DESCRIPTION OF THE DRAWINGS

The above and other objects, advantages and features of the invention will become more apparent when considered with the following specification and accompanying drawings wherein.

DETAILED DESCRIPTION OF THE INVENTION

Figure 2:
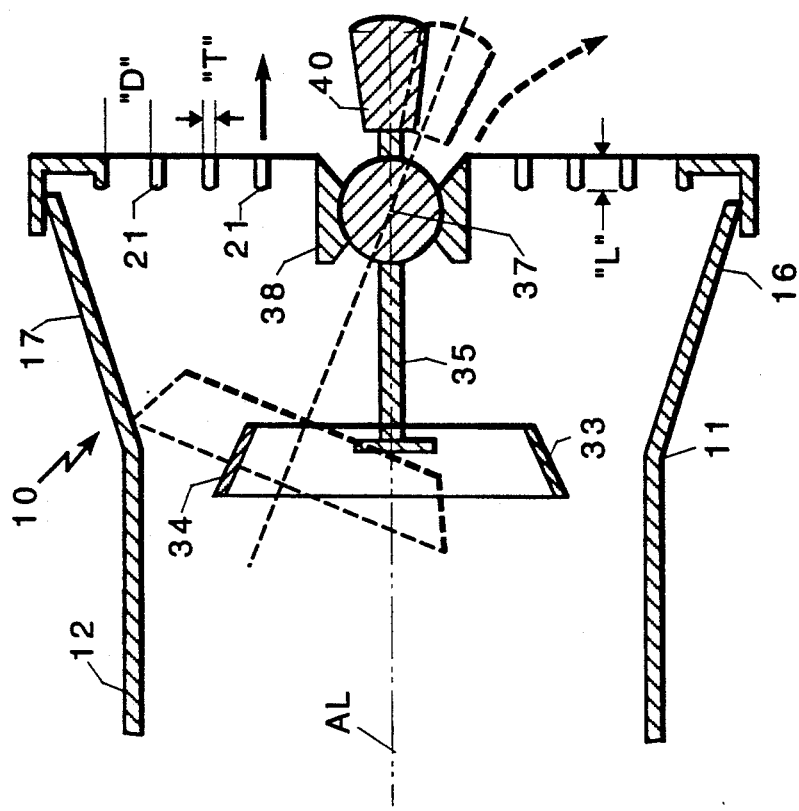
FIG. 2 is a sectional view of the air discharge nozzle shown in FIGS. 1a–c, FIGS. 3a, 3b, 3c, and 3d, are examples of grill cell patterns.
Figure 1A:
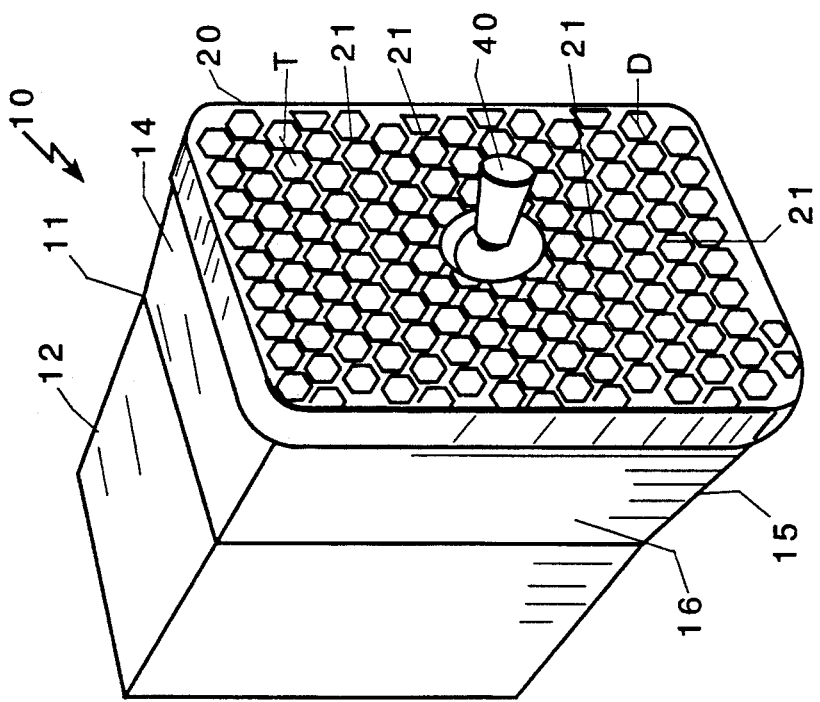
FIG. 1a is an isometric illustration of a vehicular air discharge nozzle incorporating the invention.
Figure 1C:
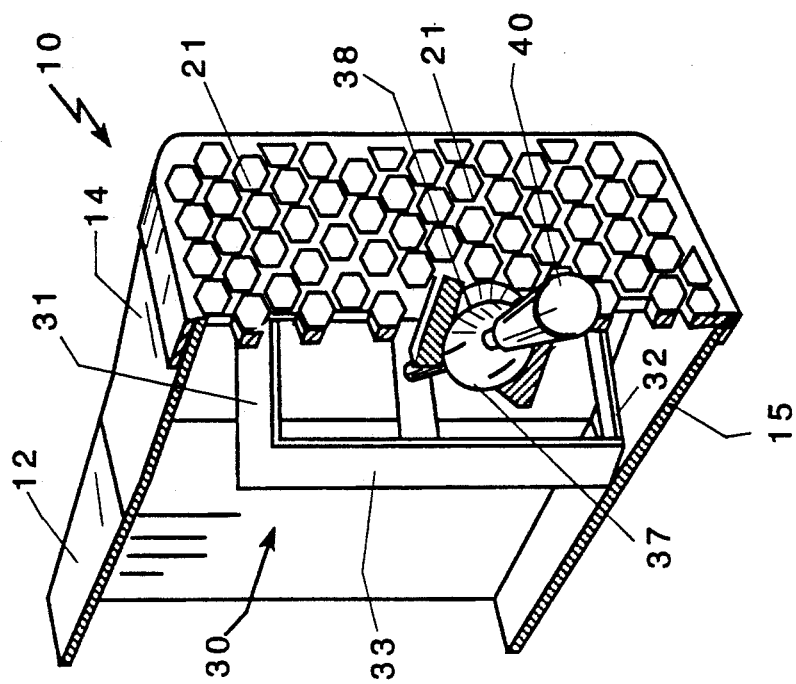
FIGS. 1b and 1c are similar views broken away to reveal the intruder.
Figure 1B:
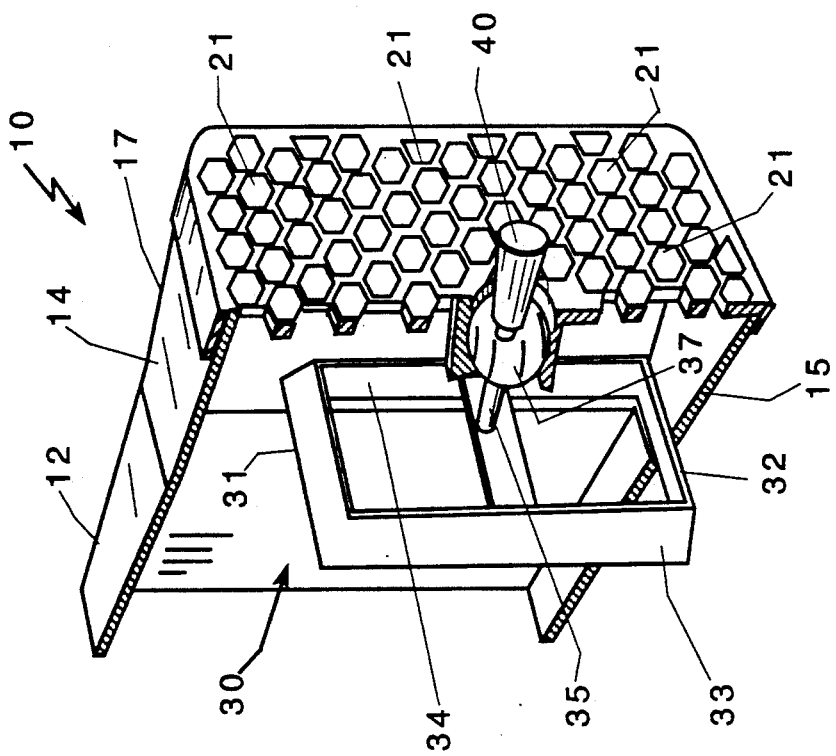

Referring to FIGS. 1 and 2 (which is a horizontal section through FIG. 1), a nozzle 10 incorporating the invention has an upstream end 11 coupled to an air supply duct 12. In this embodiment, the duct is rectangular, but it could be circular or oval in cross-section. Diverging top 14, bottom 15, sides 16 and 17 form the downstream outlet which is closed off by grill 20, which is formed of a monolayer of polygonal cells (hexagonal) in an array of cells bounded by planar walls 21 having a depth L, an interstitial thickness T, and a major diameter D. The grill 20 is mounted to close off the downstream outlet end by an annular rim 22, but could be part of a larger molding having other functional attributes with the downstream outlet end secured by fasteners or adhesive, etc. (not shown).

In the preferred embodiment, directionality of air flow is controlled by open frame intruder member 30, which in the embodiment illustrated, is rectangular, having top and bottom intruder members 31 and 32 and side intruder members 33 and 34 to form an endless open frame. Intruder members 31, 32, 33 and 34 converge slightly from their upstream edges to their downstream edges so that, within limits, regardless of the angular orientation of the open frame of intruder 30 to the axial center AC, its cross-sectional area projected on a plane normal to the axial center AC, is essentially constant to where one of the members 31 or 32 and one of members 33 or 34 is parallel to the axial center (see the phantom position in FIG. 2). As one member projects a larger area on the plane, the other member casts or projects a correspondingly smaller area, thereby maintaining the impedance essentially constant.

Moreover, since each intruder member is spaced from the axial center when the open frame intruder is centered (and not causing any air deflection, the amount of movement of the control shaft 35 is significantly less than the case where a single intruder member is swinging from one boundary wall to the other). However, the benefits of the grill features discussed earlier herein are just as applicable to single intruder members as to the open frame intruder member.

A cross member 36 secures the upstream intruder 30 to the upstream end of control shaft 35. A spherical ball 37 on shaft 35 is received in split spherical socket 38 which is formed, preferably, in the axial center of grill 20, and a manual control knob 40 is formed on the end of shaft 35. The members 31, 32, 33, 34 of the intruder 30 operate in conjunction with a respective side of the nozzle which it is directed to approaches to direct the air flow to the opposite side, as shown in phantom or dashed lines in FIG. 2, which corresponds with the direction of deflection of the intruder 20 shown in FIG. 1c. In FIGS. 1a and 1c, the intruder is axially centered so there is no deflection. This construction provides for up, down, left and right deflections as well as those in between. Instead of knob 40 or spherical surface with a bump to indicate the axial center, and manipulated by a thumb or index finger.

The effect of the novel grill cell design and geometry on visual opacity as well as its effect on performance parameters of face velocity and deflectability of the air stream will be described in relation to the graphs of FIGS. 4, 5 and 6. The effect of the interstitial wall thickness on the face velocity and is expressed in the graph of FIG. 4 as related to the percent of open cell area. The reason % open was chosen is because the proper thickness is also dependent on cell shape size.

Figure 4:
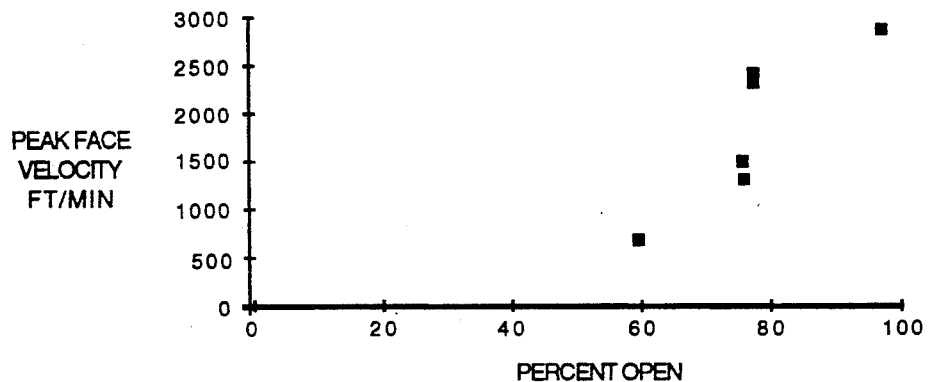
FIG. 4 is a graph showing the result of tests of percent open cell area versus peak face velocity in feet per minute.

An acceptable face velocity is in the order of 1800 ft/min which corresponds to an open cell area of about 76% in the graph of FIG. 4.

The next parameter to consider is the effect of cell L/D on the ability to deflect the stream. That is, the cell should be thin enough in depth to not redirect the deflected airstream. The test results are shown in FIG. 5 where the ratio of the deflection angle with grill to the deflection angle without grill is plotted against the cell depth/diameter (L/D).

Figure 5:
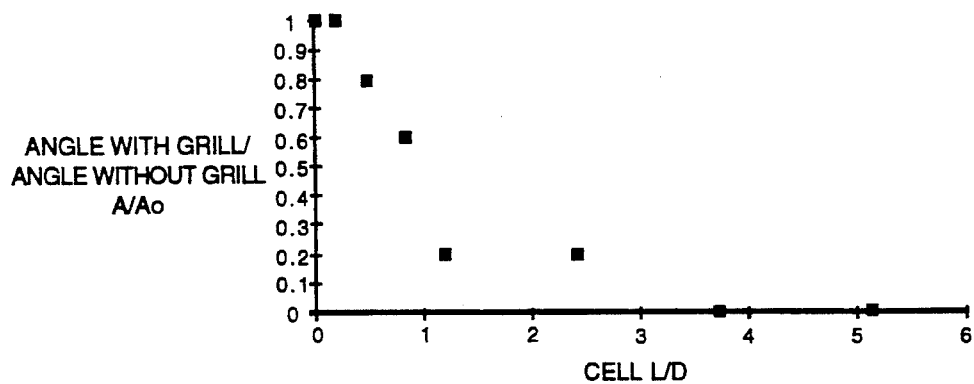
FIG. 5 shows the effect of the cell L/D ratio on the ability to deflect the air stream and is a graph of the ratio of the deflection angle with grill to the deflection without grill plotted against the cell depth/diameter (L/D) ratio.

As can be seen in the graph of FIG. 5, a L/D ratio up to 0.6 may be used to obtain an acceptable deflection angle. If the cell is deeper, i.e., L/D>0.6, then the deflection is impaired by the grill.

Figure 6:
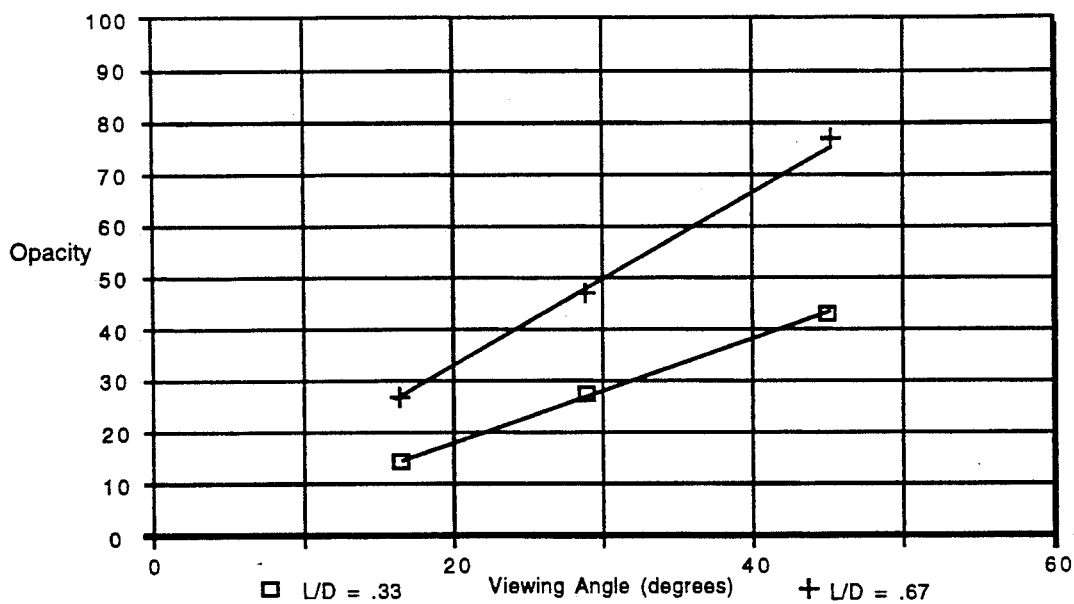
FIG. 6 is a plot of relative opacity vs. viewing angle for various L/D ratios.

Finally, the opacity of the grill was analyzed where the percent of the available cell area which is opaque is plotted vs. the viewing angle (from the perpendicular to the face of the grill) in FIG. 6. In reviewing FIG. 6, it must be remembered that the current grills are very transparent in that large areas behind the grill can b seen at even large angles; up to 70 degrees.

CELL GEOMETRY FOR PROPER FACE VELOCITY

According to the invention, the open cell area Ao is preferably at least about 76% of the available (total) area to obtain an acceptable 1800 ft/min face velocity at blower pressure of 0.24 inches $H_2O$. Mathematically stated this is:

$$\frac{Ao}{Ao + Ai} \geq 0.76$$

where Ao is the open cell area, and
where Ai is the interstitial area
Dividing by Ao this becomes:

$$\frac{1}{1 + \frac{A_i}{A_o}} \geq 0.76 \text{ or } \frac{A_i}{A_o} \leq 0.316$$

The cell geometry in terms of t/D, changes for each cell shape, i.e.

$$\frac{A_t}{A_o} = K\frac{t}{D}$$

where
t = interstatial thickness
D = cell "diameter"

| CELL SHAPE | K | t/D max for 76% open area | L/T (FOR MOLDING) |
|---|---|---|---|
| square | 2.0 | .158 | 3.8 |
| hexagon | 2.3 | .137 | 1.4 |
| triangle | 3.5 | .090 | 6.7 |

(In the above Table, the L/T figures are for molding purposes.)

Figure 3A:
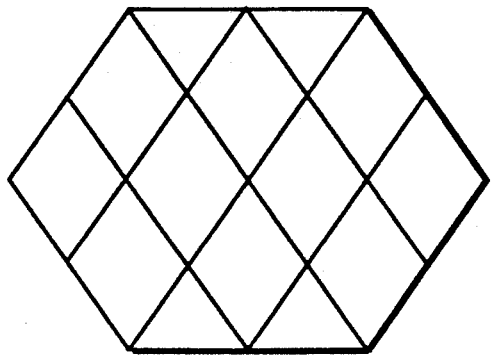
Figure 3B:
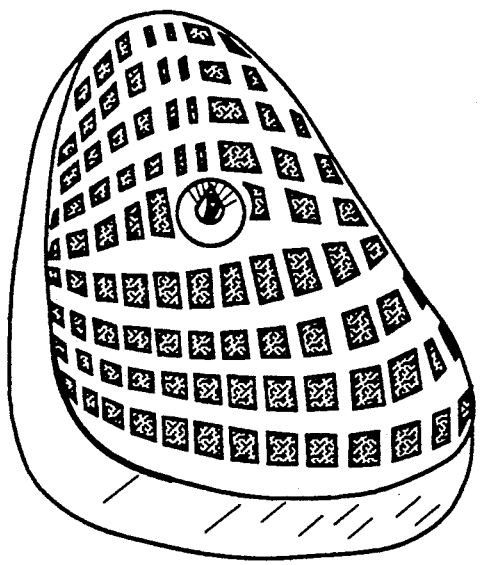
Figure 3C:
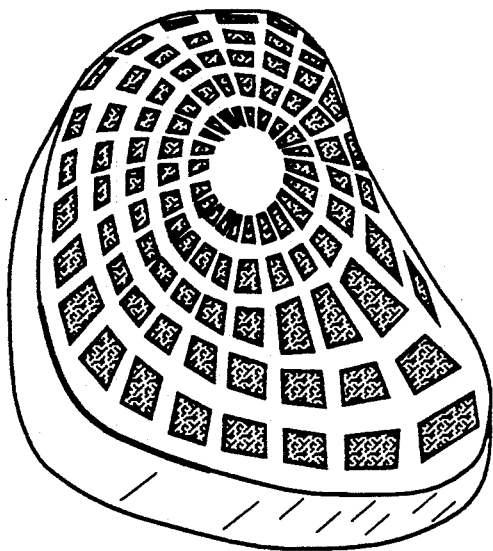
Figure 3D:
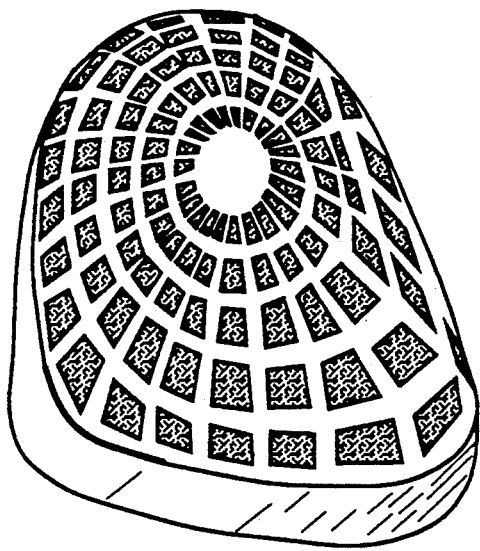

Various cell geometries are shown in FIGS. 3a-3b. FIG. 3a shows a cell array wherein the cells are diamond-shaped and the major diameter is the largest diameter; in FIG. 3b. FIGS. 3b-3d show various forms of essentially square cell patterns where the major diameter D is an average of cell diameters. While a triangular cell pattern could be used, this is a less preferred embodiment of the invention.

While a preferred embodiment of the invention has been shown and described, and several further embodiments illustrated, it will be appreciated that various other embodiments and modifications will be apparent to those skilled in the art.

What is claimed is:

1. In a nozzle for discharging air to ambient and having an axial center and upstream and downstream ends, upstream end means for directing air in different directions relative to said axial center and a grill at the downstream end of said nozzle, the improvements comprising, said grill being comprised of a monolayer of polygonal cells in an array of cells bounded by planar walls having a depth L, interstitial thickness T, and said cells having a major diameter D, and wherein:

L is short enough such that said planar walls do not significantly affect directionality of the air as imparted by said upstream means for directing, and T has a value such that the impedance to air flow is very low, the length L to diameter D ratio (L/D) is no greater than about 0.7 and no less than about 0.3, such that the degree of opacity of said grill is relatively high.

2. The nozzle defined in claim 1 wherein said cells are hexagonally-shaped and the ratio of T/D is such that:

$$\frac{Ao}{Ao + Ai} \geq 0.76$$

where Ao is the open cell area and Ai is the interstitial area.

3. The nozzle defined in claim 1 wherein said grill is a molded plastic and L is no greater than 5 T.

4. The nozzle defined in claim 1 wherein said planar walls are substantially parallel.

5. The nozzle defined in claim 4 wherein said nozzle has a curved surface facing said ambient 6. The nozzle defined in claim 1 wherein said upstream end has an area A1, said upstream means is a movable intruder member having an area A2 projected on a plane which is transverse to said axial center which, area A2 is a small fraction of the area A1, and a control member extending through said downstream end for positioning said movable intruder member.

7. The nozzle defined in claim 6 wherein said intruder member is an endless frame having upstream edges and downstream edges joined by wall members.

8. The nozzle defined in claim 7 wherein said wall members converge.

9. The nozzle defined in claim 7 including a control member mounting brace extending transversely relative to said axial center and secured to said wall members.

10. The nozzle defined in claim 7 wherein said control member is a shaft and includes a spherical ball thereon, and a spherical socket centrally formed in said grill for receiving and returning said spherical ball, said spherical socket being adapted to permit movement of said shaft such that said endless frame can be positioned coaxially aligned with said axial center and in an arcuate path in said upstream end to act in conjunction with said upstream end to direct air through said grill in an opposite direction, respectively.

11. In a nozzle for discharging air to ambient and having an air inlet and an axial center and upstream and downstream ends, upstream end intruder means for causing the deflection of air in different directions relative to said axial center, said upstream end having an input with bounding walls, and an area A1, the improvement in said upstream end intruder means wherein said intruder member is an endless frame having an area A2 projected on a plane transverse to said axial center which is substantially less than 50% of said area A1, said endless frame being open in the center and having walls which converge, a control shaft secured at one end to said endless frame and having means for rotatably mounting said shaft in coaxial alignment with said axial center, said control shaft being adapted to position said endless frame at different positions relative to the sidewalls of said air inlet.

12. A nozzle as defined in claim 11 including a grill at the downstream end of said nozzle, said grill being comprised of a monolayer of cells in an array of cells bounded by planar walls having a depth L, interstitial thickness T, and diameter D, and wherein:

L is short enough such that said planar walls do not significantly affect directionality of the air as imparted by said upstream means for directing, and T has a value such that the impedance to air flow is very low, the length L to diameter D ratio (L/D) is no greater than 0.6 and no less than 0.3, such that the relative opacity of said grill when viewed from any angle is high.

13. The nozzle defined in claim 12 wherein said cells are hexagonally-shaped and the ratio of T/D is such that:

$$\frac{Ao}{Ao + Ai} \geq 0.76$$

where Ao is the open cell area and Ai is the interstitial area.

14. The nozzle defined in claim 12 wherein said grill is a molded plastic and L is no greater than 4 T.

15. The nozzle defined in claim 12 wherein said frame is rectangular.

16. The nozzle defined in claim 12 wherein said nozzle includes a rectangular air inlet and including an outlet grill at the downstream end of said nozzle, said outlet grill having optical opacity at predetermined angles of viewing, and substantially unaffecting and directionally imparted to said air by said endless frame member, and having a face velocity of at least 1800 CFM.

17. The nozzle defined in any one of claims 1-16 wherein said nozzle is a vehicle air outlet nozzle.

18. A method of providing high visual opacity to an air outlet having upstream directionality control and a downstream outlet grill, comprising:

constructing said grill as a monolayer of polygonal cells in an array of cells bounded by planar walls which are common to adjacent cells, said planar walls having a depth L an interstitial thickness T and said cells having a major diameter D, and wherein L is sufficiently short such that said planar walls do not act as steering vanes and affect directionality of air imparted thereto by said upstream directionality control, T has a value such that the impedance to air flow is very low, and the ratio L/D is no greater than about 0.7 and no less than about 0.3, and mounting said grill on said outlet.

19. The method defined in claim 18 wherein said grill is molded plastic and causing said planar walls to be molded parallel to each other, respectively.

* * * * *